Patented Feb. 2, 1954

2,668,161

UNITED STATES PATENT OFFICE 2,668,161

PRESERVATION OF BUTADIENE COPOLYMERS

David J. Beaver, Richmond Heights, Mo., assignor to Monsanto Chemical Company, St. Louis, Mo., a corporation of Delaware No Drawing. Application November 14, 1951, Serial No. 256,359

8 Claims. (Cl. 260—45.95)

This invention relates to new and useful compositions of matter and to methods of making the same. More particularly it relates to stabilized copolymers of butadiene and styrene.

An object of the invention is to provide a new class of nondiscoloring antioxidants for the copolymer rubber known as GR-S. A further object is to provide a class of antioxidants suitable for adding directly to latex obtained by the emulsion copolymerization of butadiene and styrene. A still further object is to provide a class of materials which prevent continued polymerization of butadiene-styrene copolymers and inhibit the deleterious effects of oxygen, heat and light. Other and further objects will in part be apparent and in part particularly pointed out in the description following.

It has been found that these and other objects are achieved by treating copolymers of butadiene and styrene with an aralkylated hydroxy biphenyl.

The new stabilizers may be represented by the general formula

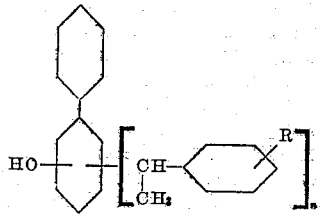

where R represents hydrogen, chlorine or an alkyl radical as for example methyl, ethyl, isopropyl, butyl and the like and $n$ is an integer less than 3. The new compounds are prepared conveniently and in good yields by reacting an aromatic compound possessing a $CH_2=CH-$ substituent attached to the aromatic nucleus, for example, styrene, o- and p-chlor styrene, o-, m-, and p-methyl styrene, o-, m- and p-ethyl styrene, p-tert. butyl styrene, and the like, with a hydroxy biphenyl in the presence of a boron trifluoride catalyst. The catalyst is preferably employed in the form of an addition compound with an oxygen containing organic compound. The preparation is conveniently carried out in the liquid phase in making the mono-aralkyl derivatives of 2- and 3-hydroxy biphenyl, however, where desirable an inert solvent may be employed. In preparing the mono-aralkyl derivatives of 4-hydroxy biphenyl it is preferable to employ an inert solvent. Upon completion of the reaction the crude aralkylated mixture may be washed with an aqueous alkaline solution in order to remove the catalyst and the desired products separated, for example by fractional distillation. Reaction temperatures of about 60–140° C. have been found most advantageous, however, depending upon the reactants and whether or not an inert solvent is used higher or lower temperatures may be employed.

The products are generally viscous high boiling pale yellow to water-white liquids although some are resinous or crystalline. They are substantially insoluble in water but have some solubility in dilute aqueous caustic soda and in most organic solvents. While efficient stabilizers of butadiene-styrene copolymer rubbers, the products have substantially no antioxidant activity in natural rubber.

As exemplary of the preparation of the new stabilizers the following are illustrative but in nowise limitative of the invention.

Example 1

46 parts by weight of a boron trifluoride-phenol catalyst complex which contained 26.5% boron trifluoride by weight and believed to consist of a molar ratio of 1 of boron trifluoride to 2 of phenol as described by Sowa et al., J. A. C. S. 55, p. 3404, 1933, was intimately mixed with 350 parts by weight (substantially 2.05 mols) of 2-hydroxy biphenyl in a suitable reaction vessel at about 60° C. To the melt was added over a period of about one hour 368 parts by weight (substantially 3.52 mols) of styrene with agitation while retaining the temperature at about 58°–59° C. Upon completion of the styrene addition the mix was heated at about 70° C. for a period of thirty minutes. 90 parts by weight of a 25% caustic solution was stirred into the reaction mix and the composite washed several times with hot water to remove the boron trifluoride catalyst and subsequently fractionally distilled. About 62 parts by weight of unreacted 2-hydroxy biphenyl was recovered and approximately 187 parts by weight of a resinous material believed to be polystyrene was separated out of the crude reaction mix. Approximately 65% of the original charge was isolated as a pale yellow viscous liquid identified as a mixture of mono aralkylated 2-hydroxy biphenyls. Upon refractionating the latter there was obtained principally two water-white viscous liquid mono aralkylated products, one believed to be 2-hydroxy-3(α methyl benzyl) biphenyl having a boiling point of 194° C./2 mm., a specific gravity of 1.089 at 25° C. and an $N_D$ of 1.6193 at 25° C., and the other believed to be 2-hydroxy-di(α-methyl benzyl) biphenyl having a boiling point of 255°–258° C./2 mm., a specific gravity of 1.097 at 25° C. and an $N_D$ of 1.6190 at 25° C. Determination of the hydroxyl number of the latter by the Zerewitinoff method gave 4.6% hydroxy groups as compared to the calculated value of 4.5%. The figure for the former product was 6.5% hydroxy groups as compared to a calculated value of 6.2%.

*Example 2*

To a mixture of 600 parts by weight (substantially 3.52 mols) of 2-hydroxy biphenyl and 368 parts by weight (substantially 3.52 mols) of styrene was added slowly 25.5 parts by weight of a boron trifluoride-di-ethyl ether complex which possessed a boiling point of about 126° C. and contained about 48% by weight boron trifluoride, the remainder being di-ethyl ether. During the addition of the catalyst which began at about 20° C. the temperature rose momentarily to 122° C. and then dropped to about 52° C. Upon completion of the catalyst addition the mix was heated for two hours at 65°–70° C. with constant agitation. Thereupon the mix was washed with a hot aqueous caustic soda solution and subsequently with hot water to remove the catalyst and finally fractionally distilled. After removal of the unreacted 2-hydroxy biphenyl and a tarry residue believed to be polystyrene, approximately 377 parts by weight of a water-white viscous liquid identified as an aralkylated 2-hydroxy biphenyl of which the principal component was found to be the high boiling product of Example 1 which was believed to be 2-hydroxy-di($\alpha$ methyl benzyl) biphenyl.

*Example 3*

Into a glass or glass-lined container of suitable capacity was charged 340 parts by weight of ortho phenyl phenol (substantially 2 mols). 1.2 parts by weight of concentrated hydrochloric acid was added and the mixture heated and stirred at about 140° C. while 208 parts by weight (substantially 2 mols) of styrene was added. The styrene was added over a period of about thirty minutes while heating and stirring at 140°–160° C. Heating was then continued at 165°–170° C. for an additional thirty minutes and the mass cooled, 5 parts by weight of 25% aqueous sodium hydroxide added and the mixture stirred for a few minutes and cooled to room temperature. The reaction mixture was washed with hot water and finally fractionally distilled. 64.2 parts by weight or about 18.9% theory of a product having a boiling point of 192° C./3 mm. was obtained. This product is believed to be 2-hydroxy-3($\alpha$ methyl benzyl) biphenyl.

*Example 4*

Approximately 0.5 part of concentrated hydrochloric acid was added to 340 parts by weight (substantially 2 mols) of ortho phenyl phenol and the mixture heated to a temperature of 120°–130° C. 104 parts by weight (substantially 1 mol) of styrene was then added gradually over a period of forty to forty-five minutes while stirring and heating at 120°–130° C. and stirring and heating then continued for another thirty minutes. The reaction mixture was then cooled, neutralized with aqueous sodium hydroxide and fractionated. In this manner there was isolated about 4.6% yield of the same product as described in Example 3, boiling at approximately 194° C./2 mm.

Other catalysts than those specifically described may be employed as well, for example the boron trifluoride complexes with respectively dimethyl ether (boiling point about 127° C.), ethyl methyl ether (boiling point about 127° C.), di-isopropyl ether (melting point about 68° C.), amyl methyl ether (melting point about −41° C.), anisole, phenetole, phenyl ethyl ether, phenyl methyl ether, tetrahydrofuran (melting point about 9° C.), ethylene oxide, and the like. Other oxygen containing organic compounds which combine with boron trifluoride to form catalyst complexes than the preferred ether complexes which successfully aid in the production of the new monoaralkylated products are the alcohols (e. g. methanol, ethanol, isopropanol, glycol, ethylene chlorohydrin, the cresols, etc.), the esters (e. g. the methyl and ethyl esters of monobasic aliphatic acids such as formic acid, acetic acid, propionic acid, butyric acid, crotonic acid, chloracetic acid and the esters of benzoic acid, oxalic acid, maleic acid, succinic acid, etc.), the acids (e. g. formic, acetic, propionic, butyric, benzoic, glycolic, maleic, crotonic, lactic, oleic, oxalic, succinic, chloracetic, etc., and the anhydrides thereof), the aldehydes (e. g. acetaldehyde, trimethyl acetaldehyde, benzaldehyde), and the ketones (e. g. acetone, acetophenone). Amides and oximes also form boron trifluoride addition compounds which exhibit similar catalytic activity, as for example, acetamide, propionamide, and the like.

The new materials are effective in retarding polymerization during operations subsequent to cessation of the emulsion polymerization of butadiene and styrene, i. e., they retard cross linking or chain growth during the stripping and blowing down operations employed to remove the unreacted monomers. The emulsion polymerization of butadiene and styrene is carried out to about 70–80% usually and chemicals whose function is to prevent further polymerization are called "short stops." As exemplary of the "short stopping" activity of the new compounds two identical butadiene-1,3-styrene emulsion polymerization systems were prepared. The polymerization was then carried out over a period of about 16 hours under identical reaction conditions. One system was then treated with an aqueous emulsion containing approximately 0.3% by weight based upon the original total monomer charge of the product of Example 2, believed to be 2-hydroxy-di($\alpha$ methyl benzyl) biphenyl while the other system received no treatment. Agitation of the two systems was then continued at room temperature for about 5 hours. Thereupon the copolymers were coagulated and recovered in the usual manner. The copolymer treated with the di-aralkylated hydroxy biphenyl was soft and plastic whereas the product of the untreated system was hard and tough. The copolymer of the untreated system was less soluble in benzene than the treated copolymer, thus indicating that crosslinking or chain growth was retarded by the presence of the di-aralkylated hydroxy biphenyl. Substantially no increase in yield of copolymer was noted in the treated system after the 5 hour additional agitation period whereas the percent conversion increased about 5% in the untreated system.

As stabilizers for the rubber-like copolymer of butadiene-1,3 and styrene the new products may be incorporated by addition in liquid form or in emulsion to the solid synthetic rubber during the milling operation or to a latex containing the synthetic rubber dispersed in an aqueous medium such as that ordinarily obtained by an emulsion polymerization process. The preferred method of introducing the new stabilizers is to add the material to the latex before or during coagulation. Consequently, the new stabilizers are homogeneously incorporated within the synthetic rubber such that the rubber is obtained in a stabilized state. Small amounts, as for example 0.25 to 5% based upon the rubber have been found most effective, however amounts outside this range may be employed. The synthetic rubbers having incorporated therein the new products, for example reaction products of two molecular proportions of styrene and one molecular proportion of a hydroxy biphenyl, exhibited good plasticity and the rubber-like copolymers neither discolored upon exposure to light nor hardened due to heat. Other tests showed that the mixtures of reactants obtained by condensing ortho phenyl phenol with styrene and distilling off unreacted constituents were effective antioxidants for GR–S latex. Thus, the crude mixture obtained as a residue after topping the reaction mixture is an efficient antioxidant suitable for addition to the latex obtained by the emulsion polymerization of butadiene and styrene.

The invention is applicable to the protection of copolymers of conjugated dienes and vinyl aromatic compounds. Suitable examples of the former are 1,3-butadiene, isoprene, 2-cyanobutadiene-1,3, cyclopentadiene-1,3, piperylene, dimethyl butadiene-1,3 and 2-methyl-1,3-pentadiene. Vinyl aromatic compounds which may be employed include styrene, α methyl styrene, monochloro styrene, dichloro styrene, vinyl naphthalene, vinyl biphenyl, vinyl carbazole, 2-vinyl-5-ethyl pyridine and 2-ethyl-5-vinyl pyridine.

This application is a continuation-in-part of copending application Serial No. 120,599 filed October 10, 1949.

What is claimed is:

1. The process of stabilizing a rubber-like copolymer of a conjugated diene monomer and a vinyl aromatic monomer which comprises adding to the latex resulting from the emulsion copolymerization thereof a small amount of a phenethyl hydroxy biphenyl of the structure

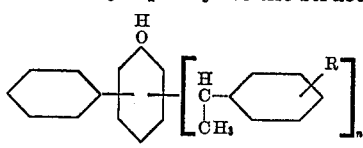

where R represents a member of the group consisting of hydrogen, chlorine and alkyl radicals and $n$ is an integer less than three.

2. The process of stabilizing a rubber-like copolymer of a conjugated diene monomer and a vinyl aromatic monomer which comprises adding to the latex resulting from the emulsion copolymerization thereof a small amount of a phenethyl hydroxy biphenyl of the structure

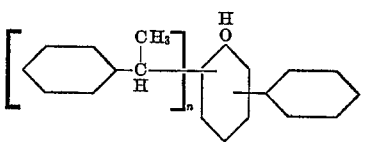

where $n$ is an integer less than three.

3. The process of stabilizing a rubber-like copolymer of butadiene-1,3 and styrene which comprises adding to the latex resulting from the emulsion copolymerization thereof a small amount of a phenethyl hydroxy biphenyl of the structure

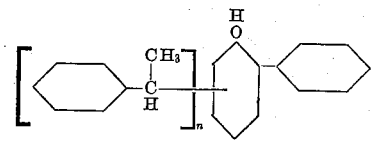

where $n$ is an integer less than three.

4. The process of stabilizing a rubber-like copolymer of butadiene-1,3 and styrene which comprises adding to the latex resulting from the emulsion copolymerization thereof a small amount of a phenethyl hydroxy biphenyl of the structure

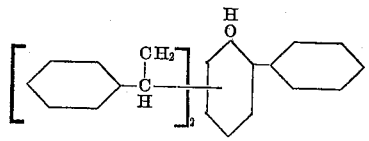

5. A rubber-like copolymer of a conjugated diene monomer and a vinyl aromatic monomer having incorporated therein a small amount of a phenethyl hydroxy biphenyl of the structure

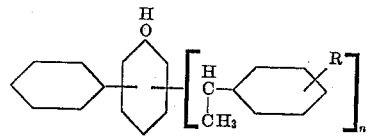

where R represents a member of the group consisting of hydrogen, chlorine and alkyl radicals and $n$ is an integer less than three.

6. A rubber-like copolymer of a conjugated diene monomer and a vinyl aromatic monomer having incorporated therein a small amount of a phenethyl hydroxy biphenyl of the structure

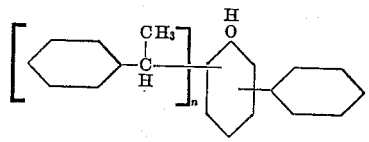

where $n$ is an integer less than three.

7. A rubber-like copolymer of butadiene-1,3 and styrene having incorporated therein a small amount of a phenethyl hydroxy biphenyl of the structure

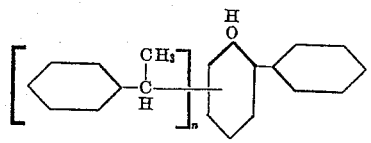

where $n$ is an integer less than three.

8. A rubber-like copolymer of butadiene-1,3 and styrene having incorporated therein a small amount of a phenethyl hydroxy biphenyl of the structure

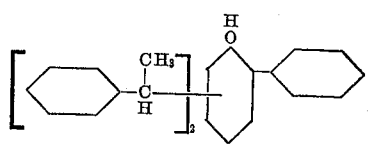

DAVID J. BEAVER.

No references cited.